Patented Feb. 2, 1937

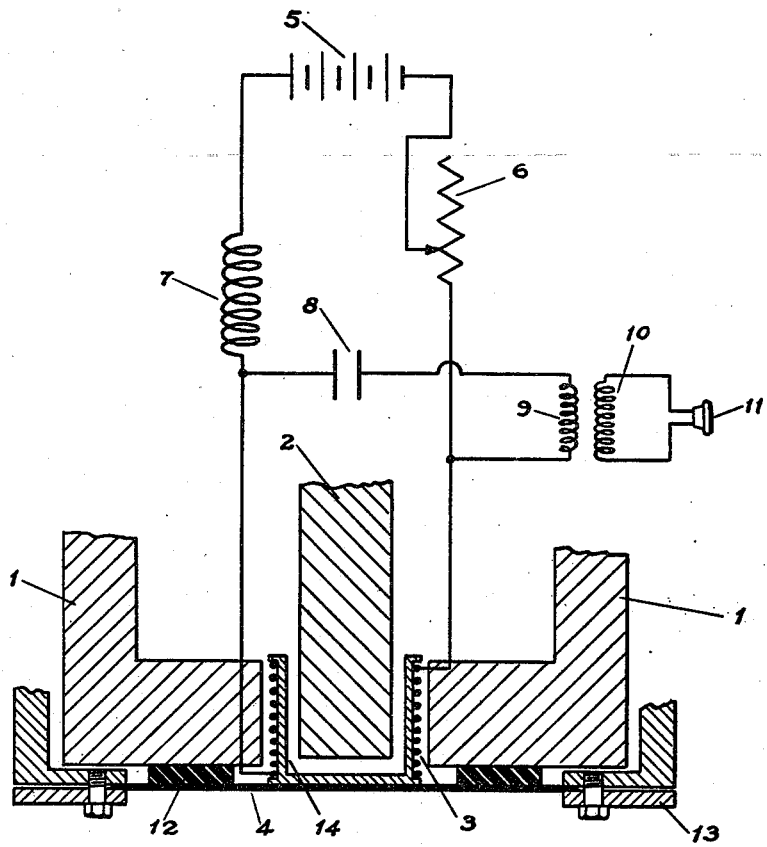

2,069,254

UNITED STATES PATENT OFFICE 2,069,254

SOUND APPARATUS

Willy Kunze, Bremen, Germany, assignor to Submarine Signal Company, Boston, Mass., a corporation of Maine Application February 24, 1930, Serial No. 430,929
In Germany March 1, 1929

2 Claims. (Cl. 177—386)

The present invention relates to sound receiving apparatus, particularly for use in submarine signaling, and more particularly for use where a plurality of receiving units must be employed together and have a definite relation with one another.

It is often necessary, in systems of the type above mentioned, to maintain definitely for a sound receiver a fixed tuning, damping and sensitivity. This has been done in the past in various manners, among the most common methods being the use of damping means, as for instance, rubber, which can be pressed against the diaphragm and by which the diaphragm can be damped and its sensitivity adjusted in the fashion desired. In such means, however, after installation it is difficult to change the damping for practical reasons, and when, through deterioration of the rubber or other ways, the characteristics of the unit change, it is impossible to readjust them again without considerable difficulty.

In the present invention, an electrodynamic receiver is employed, in which the damping may be controlled electrically, as will be explained.

The invention will be more fully described in connection with the drawing, which shows an embodiment of the same.

The electrodynamic hydrophone or receiver comprises a diaphragm 4, mounted in a casing 13, and having attached thereto a frame 14, on which is the winding 3. This winding is situated in a circular magnetic field which is formed by the magnets 1 and 2, the magnet 2 being the center core surrounded by the pole pieces of the magnet 1. The coil 3 is connected through the capacity 8 and transformer 9, 10 to the telephone 11, whereby a signal received by the diaphragm 4 may be heard.

In parallel thereto is the choke 7, the battery 5 and the resistance 6, whereby a direct current may be impressed upon the winding 3. This current will cause a definite pull upon the diaphragm 4 and also furnish a definite amount of damping, depending upon the direct current value in the coil 3 and the strength of the magnetic field.

It is also possible to use between the diaphragm 4 and the field piece 1 a rubber cushion 12 against which the diaphragm 4 may be pulled by means of the direct current passing through the winding 3.

By means of the adjustable resistance 6, which may be controlled from the position of the telephone 11, the value of the current can be changed to attain the correct amount of damping which is desired.

What is claimed is:

1. An electrodynamic converter comprising means for producing a magnetic field, a diaphragm, a coil fixed to said diaphragm and extending into said magnetic field, mechanical damping means comprising a solid yielding elastic compressible material adapted to be compressed by said diaphragm, said means being attached on the one side to said diaphragm, means presenting a substantially rigid surface touching said damping means on the other side and means for variably controlling the effect of said damping means comprising said coil, a source of electric current and adjustable means for varying the current in said coil, for compressing the said damping means, said coil serving to cooperate with the magnetic field to convert acoustic to electric energy.

2. An electrodynamic converter comprising means producing a cylindrical magnetic field, a coil located in said field, a diaphragm positioned normal to the coil and attached thereto, means supporting the diaphragm near its periphery, a rubber damping ring positioned in the inside of the diaphragm, means positioned behind said damping means for restraining the motion thereof, a source of direct current and means for impressing the same upon said coil, said coil serving to cooperate with the magnetic field to convert acoustic to electric energy.

WILLY KUNZE.